United States Patent [19]

Sattinger

[11] Patent Number: 5,108,802

[45] Date of Patent: Apr. 28, 1992

[54] INTERNALLY DAMPED THIN-WALLED, COMPOSITE LONGITUDINAL MEMBER HAVING DEDICATED INTERNAL CONSTRAINING LAYERS

[75] Inventor: Stanley S. Sattinger, Mt. Lebanon, Pa.

[73] Assignee: Westinghouse Electric Corp., Pittsburgh, Pa.

[21] Appl. No.: 462,375

[22] Filed: Jan. 9, 1990

[51] Int. Cl.$^5$ .................................. E04B 1/84
[52] U.S. Cl. ...................... 428/34.1; 52/144; 52/309.1; 52/403; 428/36.9
[58] Field of Search .............. 428/34.1, 36.9; 52/144, 52/403, 145, 309.1; 248/562; 464/180, 181, 182, 183

[56] References Cited

U.S. PATENT DOCUMENTS 4,954,375  9/1990  Sattinger et al. .................. 428/34.1

OTHER PUBLICATIONS

"Analysis, Optimization, Fabrication and Test of Composite Shells with Embedded Viscoelastic Layers", Bronowicki and Diaz. Proceedings of Damping Nov. 1989.

Primary Examiner—James J. Seidleck
Assistant Examiner—Charles R. Nold
Attorney, Agent, or Firm—D. Schron

[57] ABSTRACT

An internally damped structure having a thin, segmented layer of high modulus composite material acting as a constraining layer and bonded on both sides to layers of viscoelastic damping layers acting as shear layers. The arrangement forms a triple layer sandwich which is embedded in the wall of the structure. A compliant filler is positioned between adjacent segments of the composite constraining layer.

In an alternate embodiment two such sandwich arrangements are embedded in the wall of the structure.

14 Claims, 3 Drawing Sheets

UNIT CELL IIIC

INTERNALLY DAMPED THIN-WALLED, COMPOSITE LONGITUDINAL MEMBER HAVING DEDICATED INTERNAL CONSTRAINING LAYERS

BACKGROUND OF THE INVENTION

This invention pertains to thin-walled composite longitudinal structural members; particularly to composite beam or bar structures subject to global vibrations that create fluctuating extensional stresses in the walls.

Vibration of machines and structures can be undesirable for reasons of comfort, controllability, noise, or susceptibility to fatigue damage.

Add-on vibration damping treatments, including both free-layer and constrained-layer types, are commonly used to dissipate vibrations in structures fabricated from metallic and composite materials. Although these add-on treatments can attain high damping performance in certain instances, there are disadvantages in their use in that they add weight, create obstructions, and are vulnerable to damage by mechanical and environmental agents. They also tend to achieve desired performance over limited temperature ranges due to temperature sensitivity of the available viscoelastic materials.

Most of the existing applications of add-on damping treatments have been to control local bending modes of vibration such as plate bending modes in flat panels and shell bending modes in cylindrical sections; however, there are also needs for the damping of long-wavelength global modes of vibration including bending, torsional, and column modes.

In contrast to the more commonly treated local bending modes, the vibratory stresses accompanying the global modes are in-plane extensional stresses that are nearly uniform through the thickness of the wall. Add-on damping treatments have been used successfully to damp global modes in a few instances.

The problem to be solved then, is to overcome the disadvantages of add-on damping treatments particularly for the damping of long-wavelength global modes of vibrations while obtaining highly damped, lightweight construction of longitudinal members such as beam or bar structures.

SUMMARY OF THE INVENTION

An internally damped composite longitudinal member having; a multi-segmented layer of high-modulus composite material operating as a constraining layer, where this constraining layer has a first and a second face.

Two layers of viscoelastic damping polymer film operating as shear layers where the viscoelastic damping polymer film is positioned upon and bonded to at least the first and second faces of the multi-segmented layer of high-modulus composite material.

And, two load bearing composite base layers, where the load bearing base layers are positioned upon and bonded to the layers of the viscoelastic damping polymer film.

Further, the multi-segmented constraining layers of high-modulus composite material are separated by a compliant filler, wherein the compliant filler prevents the bonding agent and any excess composite matrix material from bridging the motion of adjacent constraining layer segments.

BRIEF DESCRIPTION OF THE DRAWINGS

For a better understanding of the invention reference may be had to the preferred embodiment exemplary of the invention, shown in the accompanying drawings, in which.

DESCRIPTION OF THE PREFERRED EMBODIMENTS

Figure 1A:
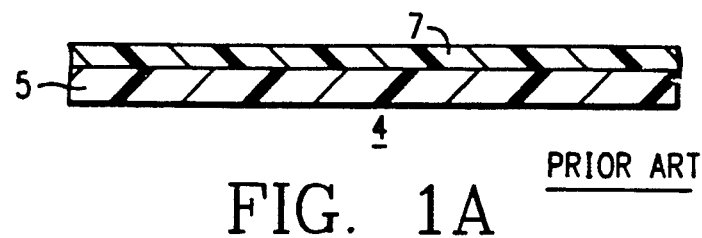
FIG. 1A is a side view schematic representation of a free-layer damping treatment as well known in the prior art.

FIG. 1A is a side view schematic representation of a free-layer damping treatment 4, as . well known in the prior art. The base member 5 has a stiff, viscoelastic damping tile 7 overlayered on the base member 5.

Figure 1B:
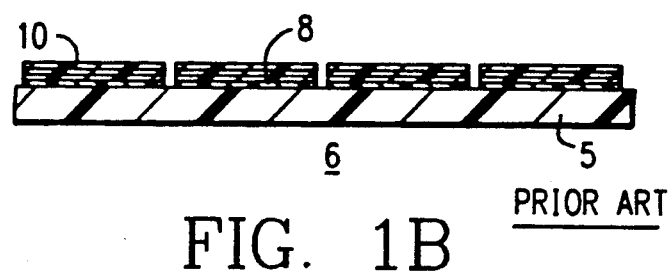
FIG. 1B is a side view schematic representation of a constrained-layer damping treatment as well known in the prior art.

FIG. 1B is a side view schematic representation of a constrained-layer damping treatment 6, as well known in the prior art. The base member 5 has a soft, viscoelastic damping film layer 8 overlayered with a multiplicity of rigid constraining layer segments 10.

Although both of these add-on treatments, the free-layer damping treatment 4 and the constrained-layer damping treatment 6 as described in FIG. 1A and FIG. 1B respectively, can attain high vibration damping performance in some instances, there are significant disadvantages. Both treatments add weight, create obstructions, are vulnerable to environmental and mechanical damage and both may worsen certain hazards specifically within the man/machine interface. Further, add-on treatments interfere with access requirements after their installation on to a planar surface.

Figure 2A:
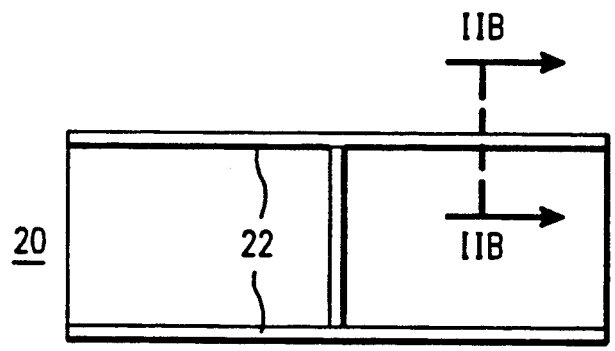
FIG. 2A is a side view schematic representation such as a beam or bar of one embodiment of a thin-walled longitudinal member, having a single dedicated internal constraining layer through the thickness of each wall.

FIG. 2A is a side view schematic representation of one embodiment of a thin-walled composite beam or bar 20 having a single dedicated internal constraining layer through the thickness of each wall 22.

Figure 2B:
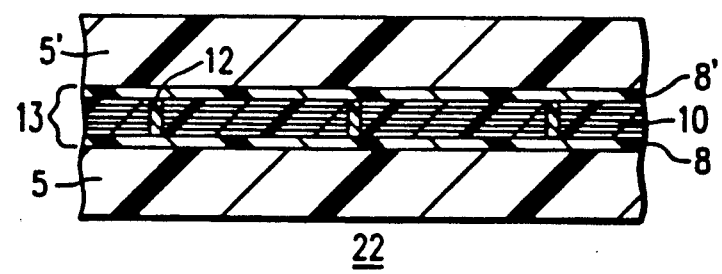
FIG. 2B is an enlarged longitudinal cross-sectional view of the member wall in one embodiment, a thin-walled longitudinal member having a single dedicated internal constraining layer, taken along line IIB—IIB, as shown in FIG. 2A.

FIG. 2B is an enlarged longitudinal cross-sectional view as taken along line IIB—IIB of the member wall 22 of one embodiment, a thin-walled longitudinal member a composite bar 20 as more clearly shown in FIG. 2A. Again a first load bearing base layer 5 is over-layered with and bonded to a first viscoelastic shear layer 8. In this embodiment of the composite longitudinal member 22, a multi-segmented constraining layer 10 having compliant filler 12 between the segments of the constraining layer 10 is overlayered with and bonded to a second viscoelastic shear layer 8', and a second load bearing base layer 5'. The first viscoelastic shear layer 8, the multi-segmented constraining layer 10 with compliant filler 12 and the second viscoelastic shear layer 8' form a damping "sandwich" 13 within the first and second load bearing base layers 5, 5'.

For the thin-walled longitudinal member, a composite beam or bar 20 of FIG. 2A and FIG. 2B, having a given constraining layer stiffness, the extensional damping performance is optimized by suitable choices of constraining layer 10 segment length and shear layer 8, 8' modulus and thickness. The optimum damping is determined by the overall constraining layer 10-to-base layer 5, 5' stiffness ratio.

Figure 3A:
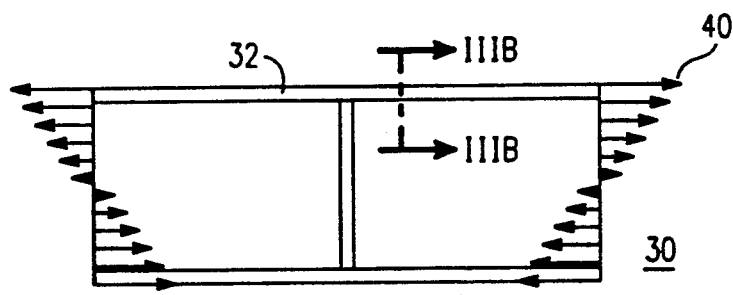
FIG. 3A is a side view schematic representation of a second embodiment, a thin-walled longitudinal member such as a beam or bar having multiple internal constraining layers through the thickness of each wall.

FIG. 3A is a side view of a schematic representation of a second embodiment, a thin-walled composite beam or bar 30 having multiple dedicated internal constraining layers through the thickness of each wall 32. Distribution of the beam mode vibratory stress 40 is transmitted through the beam 30.

Figure 3B:
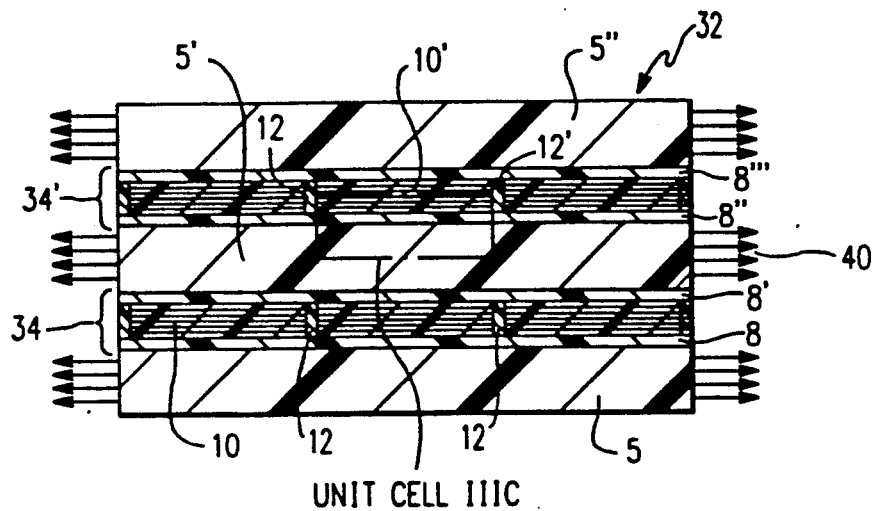
FIG. 3B is an enlarged longitudinal cross-sectional view of the member wall in a second embodiment, a thin-walled longitudinal member such as a beam or a bar having multiple constraining layers as shown in FIG. 3A.

FIG. 3B is an enlarged cross-sectional view taken along line IIIB—IIIB of the member wall 32 in a second embodiment, a thin-walled composite beam or bar having multiple internal constraining layers through the thickness of each wall as shown more clearly in FIG. 3A. There are two or more damping "sandwiches", 34, 34', through the thickness of each wall 32. Each damping "sandwich" 34, 34' has two viscoelastic layers and a common constraining layer. Each of the load bearing members 5, 5' and 5" have first and second faces. Viscoelastic shear layers 8, 8', 8", and 8'" are layered upon and bonded to the first and second faces of the load bearing members 5, 5' and 5". Two multi-segmented constraining layers 10 and 10' are laminated between the viscoelastic layers 8, 8', 8" and 8'". Compliant fillers 12 and 12' separate the segments of the multi-segmented constraining layers 10 and 10' respectively. This embodiment provides the option of using more than one type of damping polymer in a given member to widen the range of temperatures over which good damping performance may be obtained.

Figure 3C:
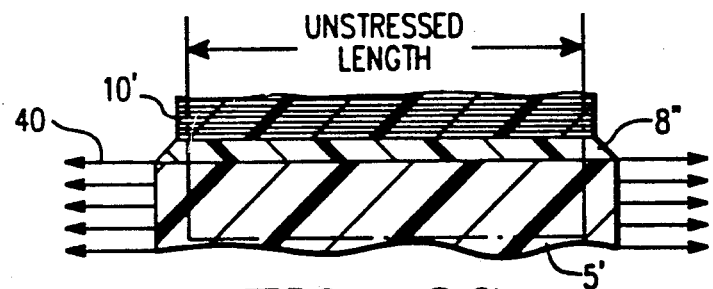
FIG. 3C is an enlarged view of a unit cell of the second embodiment, a thin-walled composite beam damping laminate as more clearly shown in FIG. 3B.

FIG. 3C is an enlarged view of a unit cell of the second embodiment a thin-walled composite beam or bar 30 as more clearly shown in FIG. 3B. Vibratory stress 40 is exerted on each load carrying layer 5'. The constraining layer segment 10' is unstressed at its ends but causes the viscoelastic layer 8" to sustain shear stresses along its length. These shear stresses are hysteretic and result in dissipation of vibration.

Figure 4:
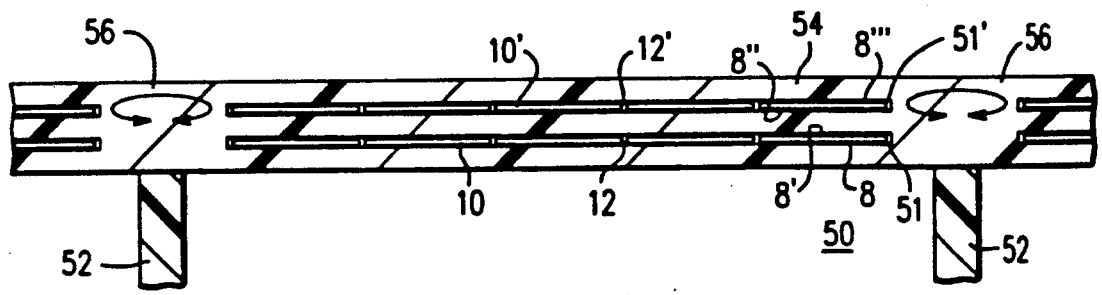
FIG. 4 is a side view schematic representation of a third embodiment of, an internally damped thin-walled composite longitudinal member, having interruption of the damping layers.

FIG. 4 is a cross-section view, of a schematic representation of a third embodiment of, a thin-walled composite longitudinal member 50 having interruption of the damping layers 51, 51'. Embedded within the wall 54 are two damping layers "sandwiches" 51, 51'. These damping layer "sandwiches" 51, 51' further contain multi-segmented constraining layers 10, 10' with viscoelastic layers 8, 8', 8" and 8'" layered upon them. The unfilled wall areas 56 between the damping layer "sandwiches" 51, 51' are made of load bearing material all the way through the load bearing base layer. Ribs or stiffeners 52 are affixed to these wall areas 56.

In summary, a stiff, thin, segmented layer of high-modulus composite material designated as a constraining layer is bonded on both sides to layers of viscoelastic damping polymer film, wherein the polymer film operates as shear layers. This multi-layer damping laminate forms a triple-layer damping layer "sandwich". Placing the damping polymer inside the member wall in, for example, the hull of a ship or submarine would protect personnel working in those vessels from the release of noxious vapors in the event of fire aboard ship. Also, this damping laminate fabrication would protect the polymer from attack by moisture, lubricants, and oxygen. The installation of the damping layers during lay-up of the member also avoids problems of access and visibility often experienced with add-on damping treatments.

Such damping layer "sandwiches" are embedded at one or more locations through the thickness of the wall of the longitudinal member to be damped. Each damping layer "sandwich" dissipates vibrational energy by sustaining large shear deformations in its low-modulus, high loss shear layers. The constraining layers create the shear stresses during the elongation of the load-carrying base layers under the action of the vibratory extensional stresses.

The constraining layers must be segmented as shown in the accompanying drawings so that the large shear deformations of the shear layers can occur over large areas of structure under the action of long-wavelength global vibrations. Compliant filler materials are inserted between each pair of adjacent segments to prevent unwanted bridging by the excess matrix material.

Fabrication of the longitudinal member, a beam or bar as shown in FIG. 3A could occur in one example as an organic composite. Fabricated by a fiber-winding or tape-layup process, the damping layers are introduced in the form of tapes or special pre-pregs. Structural components using this damping concept are also fabricated as metal-matrix or ceramic-matrix composites assembled from rigid pre-fab panels using adhesives.

This construction is applicable to closed-section tubular structures for which vibration is a concern including but not limited to; turbomachinery components, torpedo shells, robotic manipulators, shipboard machinery supports and aerospace vehicles. It is also applicable to open-section structural members such as beams and channels for use in machinery supports. Further, in all embodiments herein described the damping layer "sandwiches" using a common viscoelastic polymer might also utilize more than one type of polymer through the thickness of a given wall.

Figure 5A:
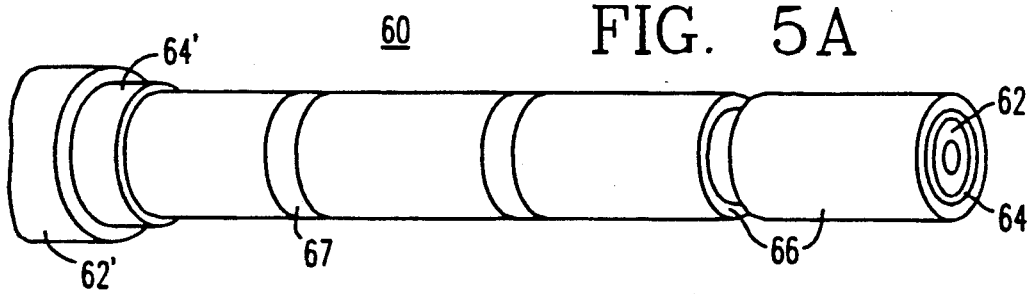
FIG. 5A is an isometric view schematic representation of a fourth embodiment of, an internally damped thin-walled composite longitudinal member having constraining layers segmented axially.

FIG. 5A is an isometric view schematic representation of a fourth embodiment of, an internally damped thin-walled composite longitudinal member 60 having constraining layers segmented axially. The walled, composite longitudinal member 60 has an open or closed tubular or cylindrical cross-section wherein the constraining layer 66 is segmented axially and separated by compliant fillers 67. Base layers 62, 62' are respectively overlayered with shear layers 64, 64', with constraining layer 66 and compliant fillers 66 therebetween. Multiple layers of base and constraining layers may be incorporated into one embodiment 60.

Figure 5B:
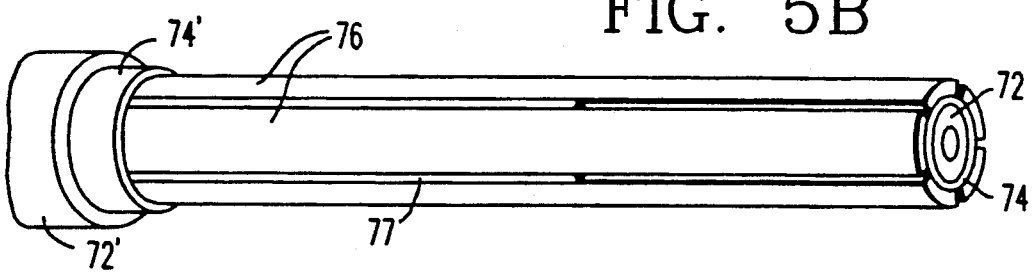
FIG. 5B is an isometric view schematic representation of a fifth embodiment of an internally damped thin-walled composite longitudinal member having constraining layers segmented circumferentially.

FIG. 5B is an isometric view schematic representation of a fifth embodiment of an internally damped thin walled composite longitudinal member 70 having constraining layers segmented circumferentially. The walled, composite longitudinal member 70 has an internal constraining layers segmented circumferentially. Base layer 72, 72' are overlayered with shear layers 74, 74' with and constraining layer 76 and compliant fillers 77 therebetween. Multiple layers of base and constraining layers may be incorporated into one embodiment 70.

Figure 5C:
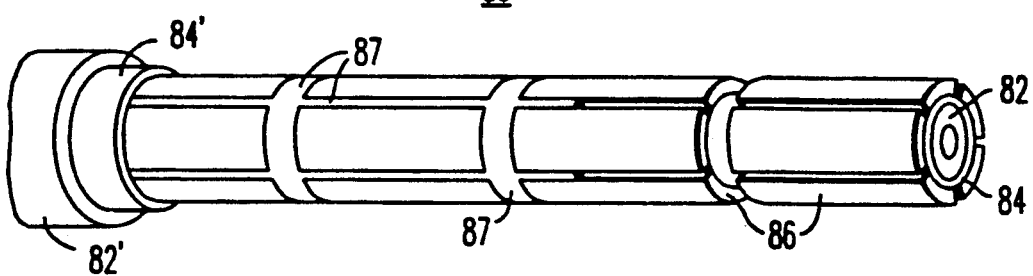
FIG. 5C is an isometric view schematic representation of a sixth embodiment of an internally damped thin-walled composite longitudinal member having constraining layers segmented both axially and circumferentially.

FIG. 5C is an isometric view schematic representation of a sixth embodiment of an internally damped thin-walled composite longitudinal member 80 having constraining layers segmented both axially and circumferentially. The walled, composite longitudinal member 80 has an internal constraining layer segmented both axially and circumferentially. Base layer 82, 82' are overlayered with shear layers 84, 84' with and constraining layer 86 compliant fillers 87 therebetween. Multiple layers may be incorporated into one embodiment.

Numerous variations may be made in the above-described combination and different embodiments of this invention may be made without departing from the spirit thereof. Therefore, it is intended that all matter contained in the foregoing description and in the accompanying drawings shall be interpreted as illustrative and not in a limiting sense.

I claim:

1. An internally damped thin-walled composite longitudinal member, said composite longitudinal member having at least one-wall comprising:
   at least one multi-segmented layer of high-modulus composite material operable to function as a constraining layer, said constraining layer having a first and a second face;
   at least two layers of viscoelastic damping polymer film operable to function as a shear layer, said viscoelastic damping polymer film positioned upon at least said first and said second faces of said constraining layer;
   at least two load bearing base layers, said load bearing base layers being positioned upon said layers of viscoelastic damping polymer film; and
   said multi-segmented layer of high-modulus composite material being separated by a compliant filler, said compliant filler being inserted between adjacent segments of said composite material.

2. An internally damped, thin-walled, composite beam, comprising:
   at least two load bearing base layers, each of said load bearing base layers having a first and a second face, said first and said second faces being planar and parallel;
   at least two viscoelastic shear layers, said viscoelastic shear layers residing upon said second face of said load bearing base layers;
   at least one multi-segmented constraining layer, said constraining layer residing upon said viscoelastic shear layer; and
   said segments of said multi-segmented constraining layer being separated by a compliant filler.

3. A means for providing high damping performance through the dissipation of vibrational energy by sustaining large shear deformation in low-modulus, high-loss shear layers in thin-walled composite structures, comprising;
   an internal multi-segmented constraining layer, said constraining layer having a first and a second side;
   at least two shear layers, said shear layers residing upon said first and said second sides of said constraining layer;
   at least two load bearing base layers, each of said load bearing base layers having a first and a second face, said first and said second faces being planar and parallel, said two load bearing base layers being positioned upon said shear layers; and
   said segments of said multi-segmented constraining layer being separated by a compliant filler.

4. A means for providing high damping performance in fiber-reinforced, thin-walled composite structures, as in claim 3 wherein said constraining layer is a high-modulus composite material.

5. A means for providing high damping performance in fiber-reinforced, thin-walled composite structures, as in claim 3 wherein said shear layer is a viscoelastic damping polymer film.

6. An internally damped, thin-walled composite longitudinal member as in claim 1, wherein said longitudinal member further comprises an open cylindrical cross-section.

7. An internally damped, thin-walled composite longitudinal member as in claim wherein said longitudinal member further comprises a closed cylindrical cross-section.

8. An internally damped, thin-walled composite longitudinal member as in claim 1, wherein said constraining layer is segmented axially.

9. An internally damped, thin-walled composite longitudinal member as in claim 1, wherein said constraining layer is segmented circumferentially.

10. An internally damped, thin-walled composite longitudinal member as in claim 1, wherein said constraining layer is segmented axially and circumferentially.

11. An internally damped, thin-walled composite longitudinal member as in claim 1, wherein said viscoelastic damping polymer film positioned upon said first face of said constraining layer is different from said viscoelastic damping polymer film positioned upon said second face of said constraining layer.

12. An internally damped, thin-walled composite longitudinal member, said composite longitudinal member having at least one wall and a cylindrical cross-section, said internally damped, thin-walled composite longitudinal member, comprising:
   at least one multi-segmented layer of high-modulus composite material, said multi-segmented layer of high-modulus composite material being segmented axially, said composite material operable to function as a constraining layer, said constraining layer having a first and a second face;
   at least two layers of viscoelastic damping polymer film operable to function as a shear layer, said viscoelastic damping polymer film positioned upon at least said first and said second faces of said constraining layer;

at least two load bearing base layers, said load bearing base layers being positioned upon said layers of visco-elastic damping polymer film; and said segments of said multi-segmented constraining layer being separated by a compliant filler.

13. An internally damped, thin-walled composite longitudinal member, said composite longitudinal member having at least one wall and a cylindrical cross-section, said internally damped, thin-walled composite longitudinal member, comprising:

- at least one multi-segmented layer of high-modulus composite material, said multi-segmented layer of high-modulus composite material being segmented circumferentially, said composite material operable to function as a constraining layer, said constraining layer having a first and a second face;
- at least two layers of viscoelastic damping polymer film operable to function as a shear layer, said viscoelastic damping polymer film positioned upon at least, said first and said second faces of said constraining layer;
- at least two load bearing base layers, said load bearing base layers being positioned upon said layers of visco-elastic damping polymer film; and
- said segments of said multi-segmented constraining layer being separated by a compliant filler.

14. An internally damped, thin-walled composite longitudinal member, said composite longitudinal member having at least one wall, and a cylindrical cross-section, said internally damped, thin-walled composite longitudinal member, comprising:

- at least one multi-segmented layer of high-modulus composite material, said multi-segmented layer of high-modulus composite material being segmented axially and circumferentially, said composite material operable to function as a constraining layer, said constraining layer having a first and a second face;
- at least two layers of viscoelastic damping polymer film operable to function as a shear layer, said viscoelastic damping polymer film positioned upon at least said first and said second faces of said constraining layer;
- at least two load bearing base layers, said load bearing base layers being positioned upon said layers of visco-elastic damping polymer film; and
- said segments of said multi-segmented constraining layer being separated by a compliant filler.

* * * * *